United States Patent [19]
Parker et al.

[11] Patent Number: 5,668,629
[45] Date of Patent: *Sep. 16, 1997

[54] REMOTE TRACKING SYSTEM PARTICULARY FOR MOVING PICTURE CAMERAS AND METHOD

[75] Inventors: Jeffrey L. Parker, Ponte Vedra Bch; David F. Sorrells, Jacksonville; John D. Mix, Jacksonville; Richard P. Daber, Jacksonville, all of Fla.

[73] Assignee: ParkerVision, Inc., Jacksonville, Fla.

[*] Notice: The term of this patent shall not extend beyond the expiration date of Pat. No. 5,179,421 and 5,268,734.

[21] Appl. No.: 533,093

[22] Filed: Sep. 25, 1995

Related U.S. Application Data

[60] Continuation of Ser. No. 984,952, Dec. 3, 1992, which is a division of Ser. No. 569,643, Aug. 20, 1990, Pat. No. 5,179,421.

[51] Int. Cl.$^6$ .......................... G01B 11/26; H04N 5/225; G05B 1/06; G01C 21/02
[52] U.S. Cl. ..................... 356/139.05; 250/203.3; 318/640; 342/158; 342/376; 348/169; 356/139.06
[58] Field of Search ............... 356/134.06, 139.05; 342/158, 376; 348/169; 318/640; 250/203.3

[56] References Cited

U.S. PATENT DOCUMENTS

| 4,905,315 | 2/1990 | Solari et al. ................ 318/640 |
|---|---|---|
| 4,974,088 | 11/1990 | Sasaki . |
| 4,980,871 | 12/1990 | Sieber et al. . |
| 5,012,335 | 4/1991 | Cohodar . |
| 5,073,824 | 12/1991 | Vertin . |

FOREIGN PATENT DOCUMENTS

| 63-191133 | 8/1988 | Japan . |
|---|---|---|

*Primary Examiner*—Stephen C. Buczinski
*Attorney, Agent, or Firm*—Arthur G. Yeager

[57] ABSTRACT

The system includes a base unit sensitive to infrared (IR) signals transmitted by a mobile remote unit to an IR receiver which is placed behind a rotating set of signal blocking blinders whose position at any time defines a view angle with a position known with precision resulting in the IR signal reception scanning across an area. The base unit detects when the peak strength of the signal occurs and utilizes this data to determine the exact effective angle between the axis of the IR signal and the base unit to create an error signal used by the base unit to position the camera mounted thereon. Receivers for TILT and two PAN positions, PAN 1 and PAN 2, are used to include range calculations for ZOOM functions. Command circuitry to override the automatic tracking function is provided in the base unit.

9 Claims, 11 Drawing Sheets

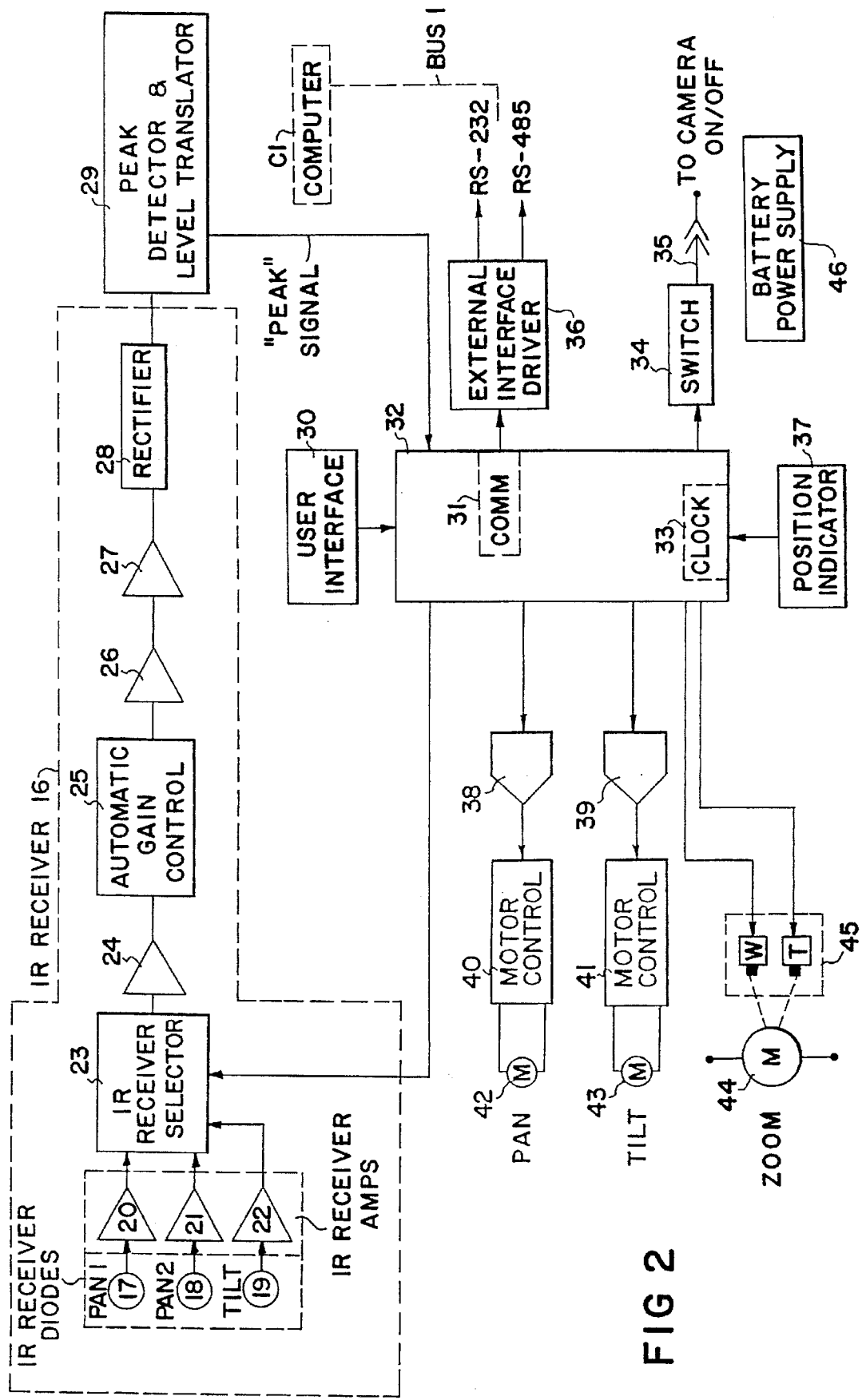

REMOTE TRACKING SYSTEM PARTICULARY FOR MOVING PICTURE CAMERAS AND METHOD

CROSS-REFERENCES TO RELATED APPLICATIONS

This is a continuation application of Ser. No. 07/984,952, filed Dec. 3, 1992, which was a Division of Ser. No. 07/569,643, filed Aug. 20, 1990, now U.S. Pat. No. 5,179,421, dated Jan. 12, 1993, entitled "REMOTE TRACKING SYSTEM PARTICULARLY FOR MOVING PICTURE CAMERAS AND METHOD".

BACKGROUND OF THE INVENTION

1. Field of the Invention

The present invention relates to tracking systems that allow cameras to automatically follow moving targets and particularly to systems that allow remote control of such tracking cameras.

2. Prior Art

Apparatus that involves automatic tracking of cameras include systems employing special coating on moving objects and multiple cameras such as that disclosed in U.S. Pat. No. 4,064,528 for following a hockey puck. See also U.S. Pat. No. 4,853,771 for objects that include proprietary encoding schemes for use in robot vision. Signal source tracking systems include U.S. Pat. No. 4,067,015 which discloses a system of multiple detectors fixed in location with computer-controller signal processing to direct a spotlight at a movable signal transmitter.

The limitations of the prior art become clear when a user desires a video camera to track his or her movements throughout an area. Multiple detectors are expensive and systems employing such schemes require time consuming set up and initial alignment procedures. Multiple cameras can be prohibitively expensive as can be the case with special filters and image-splitting systems in the device of U.S. Pat. No. 4,064,528 referenced above.

What is needed in a camera tracking system is a simple device that a user can put on the belt or in a pocket and have a camera follow the user around by focusing on the remote device or devices being worn. The system should be able to pan 360° in the horizontal and tilt widely in the vertical position. The system should specifically avoid the use of expensive optical coatings, multiple cameras, special optical filters, and expensive signal processing circuitry. The devices known in the prior art are deficient in one or more of the above aspects.

SUMMARY OF THE INVENTION

In one aspect of the present invention there is provided a system for calculating angular displacement of two objects with respect to a reference position including a base unit and a remote unit. The remote unit has a transmitter means for transmitting a signal and the base unit has a receiver means for receiving the transmitted signal. The receiver means includes reception direction control means for varying the angular displacement of the signal direction at which the transmitted signal is received by the receiver means during a time interval with respect to a reference angle as established by the reception direction control means. The reception direction control means includes position detecting means for providing a position output signal representative of the signal direction with respect to a reference angle during the first time interval. The receiver means provides a receiver output signal in response to the received transmitted signal being received at the signal direction. The receiver means further provides a first output signal in response to the receiver output signal and the base unit further includes control circuit means responsive to the position output signal and the first output signal for determining the angular displacement of the signal direction of the transmitted signal from the reference angle and for determining the angular displacement between the reference angle and the signal direction at the time the transmitted signal was received by the receiver means and provides an error output signal indicative of the angular displacement.

Specific aspects are seen in which the position output signal provided by the position detecting means is representative of an angular displacement of the signal direction from a reference angle. The receiver means is also responsive to the strength of the transmitted signal and provides a receiver output signal in response to the strength of the signal and including signal strength detection circuit means for determining the relative strength of the receiver output signal and provides the first output signal when the receiver output signal is at a predetermined level as established by the signal strength detection circuit means and is preferably the maximum level. The control circuit means determines the position of the view angle at the time when the first receiver means receives the predetermined level of signal strength of the first transmitted signal. The reception direction control means includes a pair of spaced movable signal blocking means positioned between the first transmitter means and the receiver means and defining a view angle therebetween. The receiver means receives the first transmitted signal through the view angle. This control means also includes mechanical means for repetitive movement of the movable signal blocking means with respect to the transmitter means for varying the angle at which the view angle of first transmitted signal is at in response to movement of the signal blocking means. The variation of the angular displacement of the position of the view angle occurs either in a substantially horizontal plane or vertical plane or both. The control circuit means includes means for comparing one error output signal indicative of one angular displacement with a successive error output signal indicative of a successive angular displacement for determining the directional movement of the remote unit with respect to the base unit and includes second means for determining the real time of successive angular displacements of the remote unit for determining the rate of directional movement of the remote unit with respect to the base unit. Command circuit means is also included for providing desired command signals. The base unit also includes movable means responsive to error output signals for moving it in response thereto. Command signals can enable or disable the error output signals to the movable means. Preferably, the movable means includes a motion control assembly in the horizontal and vertical planes and a camera removably mounted thereto to cause the camera to track in response to the error control signals.

In accordance with other aspects a method of calculating the angular displacement of an object with respect to a reference angle is provided and includes the steps of:

(a) transmitting by an object a signal from a radiant energy source into an area; (b) scanning the area for the transmitted signal by varying the view angle through which the transmitted signal can be received with respect to an angle during a time interval; (c) receiving by a receiver the transmitted signal through the view angle; (d) determining the point in the time interval at which each angular position of the view angle occurs during the time interval; and (e)

computing the angular displacement of the object with respect to the reference angle by comparing the point in the time interval at which the receiver received the transmitted signal with the angular position of the view angle through which the signal was received with respect to the same point in the time interval and providing an output signal indicative thereof. Step (b) may include the steps of: (f) placing a pair of spaced blinders between the transmitter and the receiver; (g) receiving the signal through the space between the pair of blinders; and (h) moving the pair of blinders with respect to the transmitter to vary the position that a predetermined level of the signal strength transmitted can be received through the area during the time interval. Step (d) may include the step of: (i) detecting the position of the blinders during the time interval; Step (b) may include the step of: (j) scanning the area substantially in the horizontal plane, vertical plane or both.

There is also provided a method of tracking a movable object by repetitively calculating the angular displacement of the object with respect to a reference angle which includes repetitively performing the above steps to provide direction and rate of movement by including the real time in the calculations. The scanning occurs in both the horizontal and vertical planes and error control signals for each plane are also generated for tracking control of the motion control assembly onto which a camera is removably mounted.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2 is a detailed block diagram of the base unit of FIG. 1;

DETAILED DESCRIPTION OF THE PREFERRED EMBODIMENT

The present invention is an electromechanical system including a movable base unit device on which a camera is mounted and designed to automatically position on a subject and follow that subject as the device moves from side-to-side (PAN) including vertical movements (TILT). A base unit houses the system computer and related circuitry which determines the camera position and movement speed in response to position data sent by a remote unit that is carried or worn by the subject. The device base unit is mounted on a tripod or table top. The tracking system is specifically designed for use with moving picture cameras, such as those employing video tape.

The base unit of the tracking system receives infrared signals from the remote unit and determines the location and distance of the subject. This is accomplished by placing an IR receiver behind a set of "blinders" designed to limit the receiver's field of view. The blinders are rotated around the fixed IR receiver and scan an area in front of the base unit. The base unit includes a microprocessor which monitors a position switch and clock timer to calculate the exact effective angle between the receiver and blinder array. When the effective receiver view angle (looking through the blinders) and remote unit transmitter are aligned, the received signal is at its highest value or "peak". The direction angle from a reference at which the peak occurred is the direction from the base unit to the remote unit. The base unit includes three IR receivers and blinder array assemblies for use respectively, in PAN 1, PAN 2, and TILT. The use of two assemblies will allow for distance calculation in accord with the usual trigonometric principles for use as needed in controlling the camera. This information from PAN and TILT allows the computer to control the direction and speed of the PAN and TILT motors. The base unit will adjust the camera to keep the subject in the field of view (FRAME) of the camera.

CIRCUITRY DESCRIPTION

Figure 1:
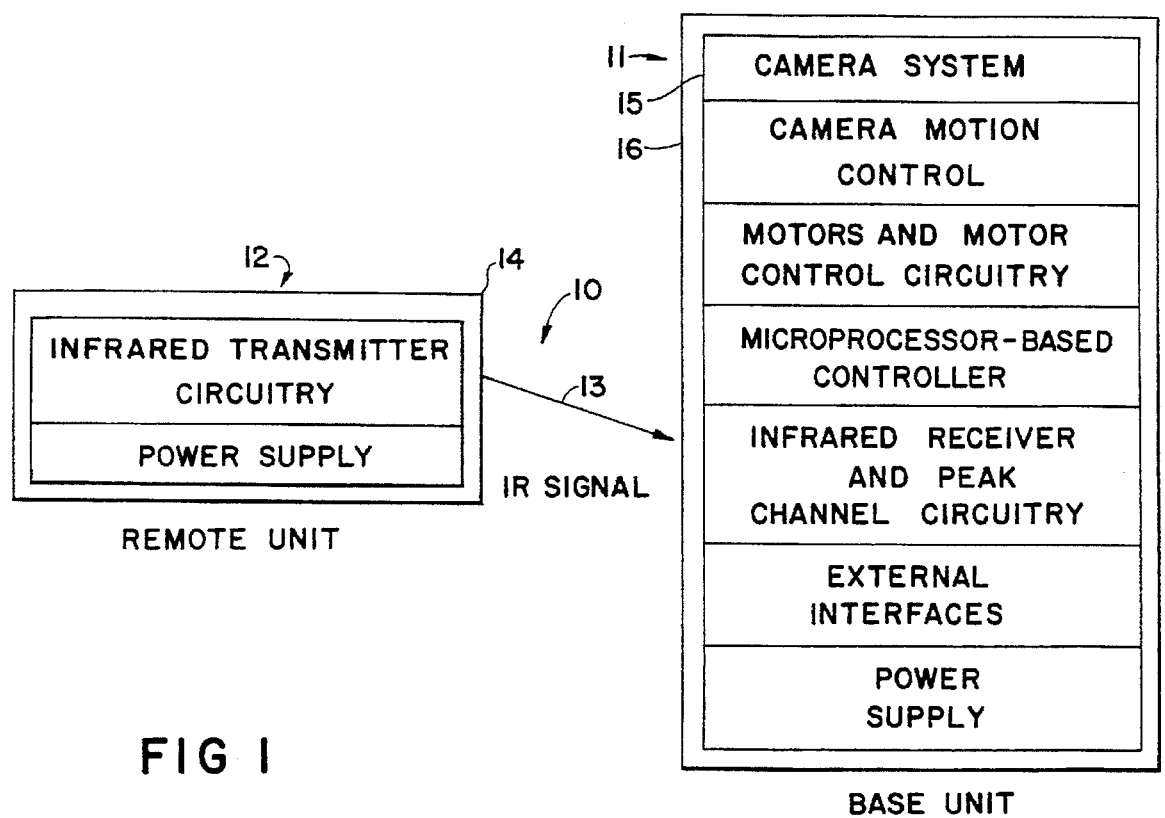
FIG. 1 is a simplified block diagram of the base unit and remote unit of the video camera tracking system in accord with the present invention.

With reference now to FIG. 1, the remote tracking system 10 in accord with the present invention is illustrated in simplified block diagram form. The base unit 11 is in communication with the remote unit 12 via one or more IR signals 13. The camera 15 is mounted with base unit 11 in a housing 16 on a tripod or table (not shown). Base unit 11 includes a microprocessor-based controller which directs control signals to the positioning motors via their controls. The unit 11 includes an appropriate power supply including a battery, which may be rechargeable as understood in the art.

The remote unit 12 is an IR transmitter in a housing 14 that includes the appropriate circuitry to modulate the IR diodes at a given frequency. The base unit 11 receives the modulated IR and alerts the microprocessor when a signal "peak" occurs. The simplest embodiment of the tracking system needs only a single PAN receiver and TILT receiver. The preferred embodiment of the system 10 employs two PAN assemblies, PAN 1 and PAN 2, for distance measurement. The three IR receiver and blinder assemblies are physically spaced and mounted for transmission through housing 16 in a manner so as not to interfere with operation of the camera 15.

With reference now to FIG. 2, a more detailed block diagram of the base unit 11 is illustrated. The base unit IR receiver circuit 16 has as its input three IR receiver diodes 17, for PAN 1; 18 for PAN 2; and 19 for TILT. Associated amplifiers 20–22 are selected one at a time by the controller 32 using IR receiver selector 23. The output of the diodes is supplied to two bandpass filters 24 and 27 which work with automatic gain control circuit 25 to improve the signal to noise ratio thus allowing for use of the system 10 over greater distances. The signal is then converted to DC via rectifier 28. Peak detector and level translator 29 provide a digital output signal representing the "peak" signal that has been transmitted from remote unit 12 and is used as the microprocessor U1 INTERRUPT.

The command circuitry of base unit 11 is built around controller 32 and communicates with user interface circuitry 30 which includes components such as switches, displays, and lights, and electronic switch 34 connected to camera ON/OFF switch plug 35. COMM circuit 31 includes a UART for external interface circuit 36 which includes drivers for all the standard baud rates and allows connection to standard RS-232 and RS-485 communication bus interfaces.

Controller 32 monitors the effective position of the IR signal 13 via a position indicator 37 and a clock circuit 33 as will be further explained. The controller 32 also supplies signals to digital-to-analog converters (DAC) circuits 38 and 39 to drive PAN and TILT motor control circuits 40, 41 respectively, which are connected to their respective PAN axed TILT motors 42 and 43. The motor control circuits 40, 41 use "chopper drive" technology with "back-emf" feedback for closed loop speed control. The DACs 38, 39 allow controller 32 to supply the proper voltage for the desired speed of motors 42, 43 to controllers 40, 41. The direction of the motors 42, 43 is also controlled by the controller 32. ZOOM motor 44 also is controlled by the controller 32 via motor control solenoids 45.

As can be understood from the above description, the "peak" signal, which indicates alignment of a base unit 11 and the remote IR transmitter unit 12, is referenced via position indicator 37 and clock 33. The controller 32 will control the receivers 17–19 and motors 42–44 as appropriate. Each IR receiver 17–19 is mounted in an IR receiver assembly, which includes blinders as will be discussed in more detail below.

Power for the entire unit 11 is supplied by battery power supply 46 which may be rechargeable or a line voltage transformer.

Figure 3:
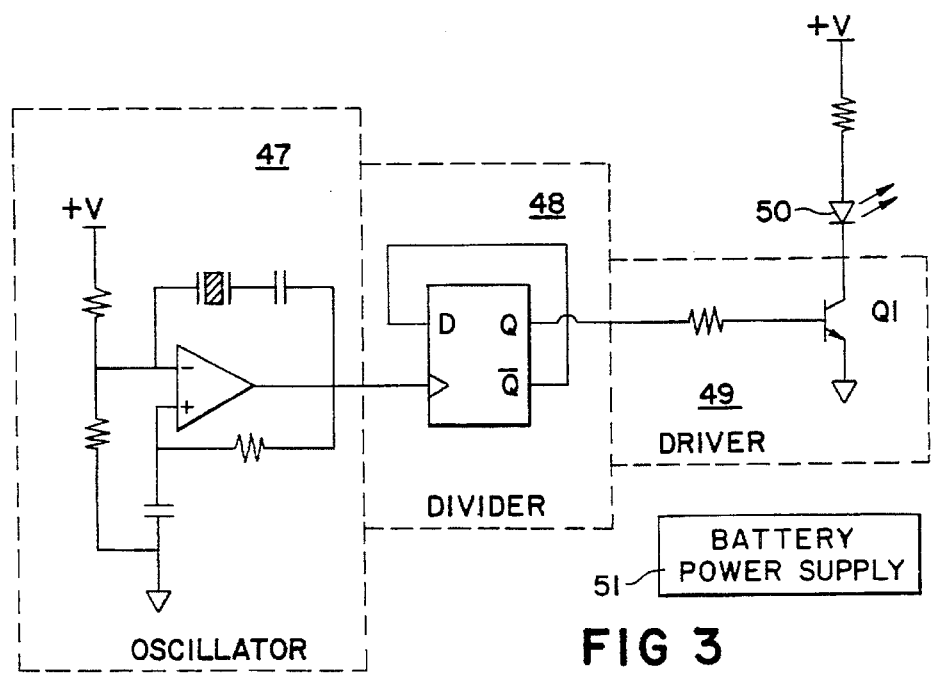
FIG. 3 is a simplified schematic diagram of the remote unit of FIG. 1.

With reference now to FIG. 3, the remote unit 12 is illustrated. Oscillator 47 and "divide-down" divider 48 sets the frequency of the IR signal. Driver 49 modulates the IR L.E.D. diode(s) 50 at the aforementioned frequency. This forms IR signal 13 for use in tracking system 10 (FIG. 1). Power for the remote unit can be a battery 51 which may be rechargeable or an appropriate DC power supply.

Figure 4:
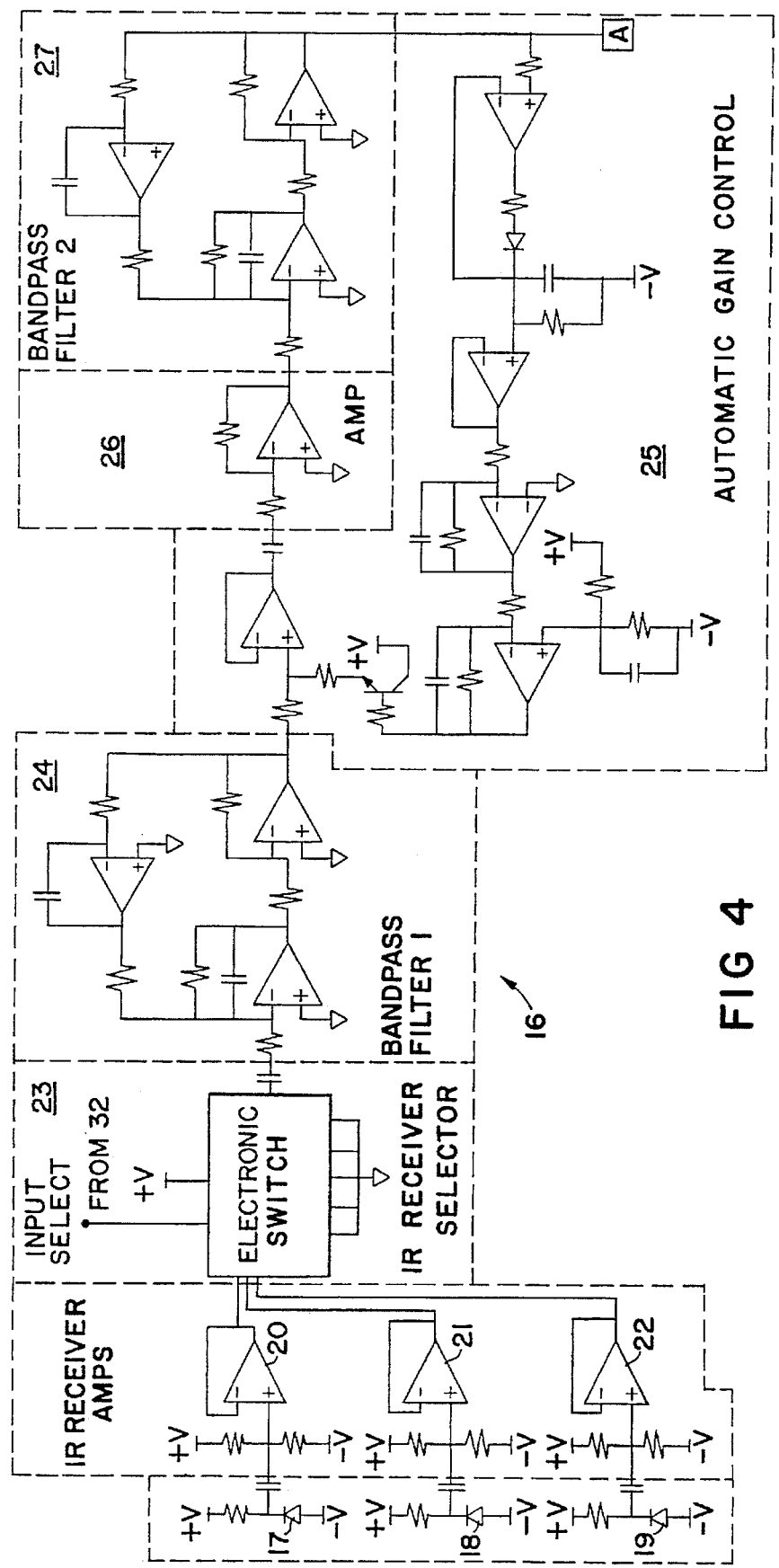
FIG. 4 is a partial schematic diagram of the receiver circuitry of the base unit.
Figure 5:
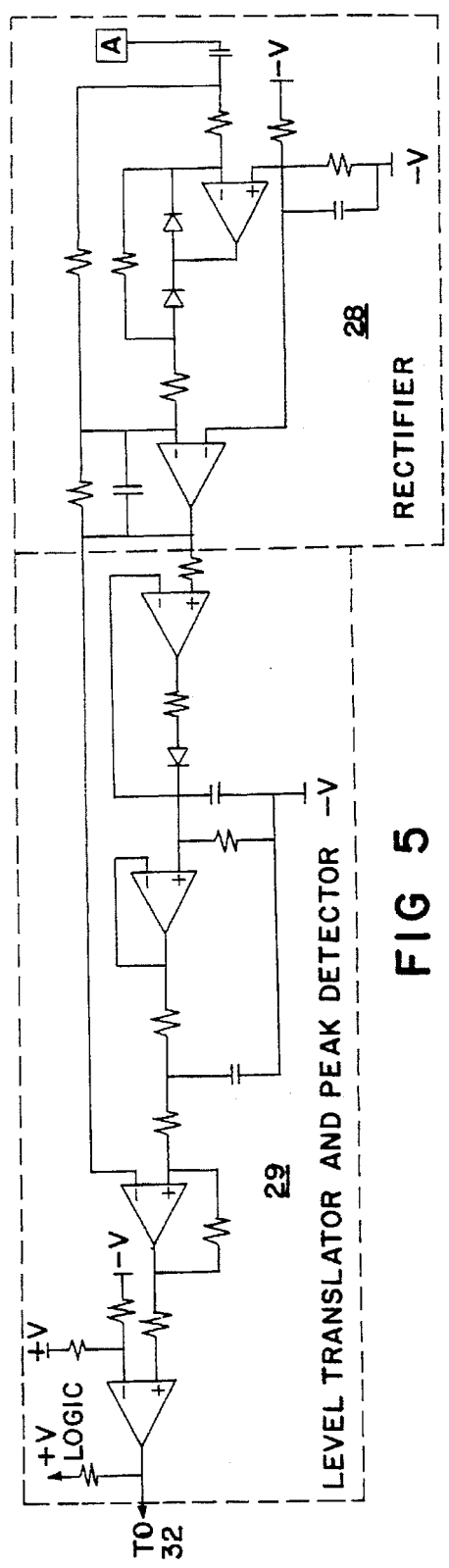
FIG. 5 is a partial schematic diagram of the receiver circuitry of the base unit.

With reference now to FIGS. 4 and 5 a more detailed schematic of the IR receiver circuitry employed in the present invention is presented.

The IR receiver circuitry 16 includes three receiver diodes 17, 18, 19 which supply an output to three amplifiers 20, 21, 22 used as high impedance to low impedance transformers. These amplifiers supply time input for the IR receiver selector 23 which connects one of the three IR diode outputs selected by controller 32 to two bandpass filters 24 and 27 which work with automatic gain control circuit 25 to improve the signal to noise ratio thus allowing for use of the system 10 over greater distances. After the signal is converted to DC via rectifier 28, peak detector 29 provides a pulse output to the level translator (also 29) for input into controller 32's INTERRUPT. The INTERRUPT signal indicates a "peak" was received at unit 11 by the selected receiver diode 17, 18 or 19.

Figure 10:
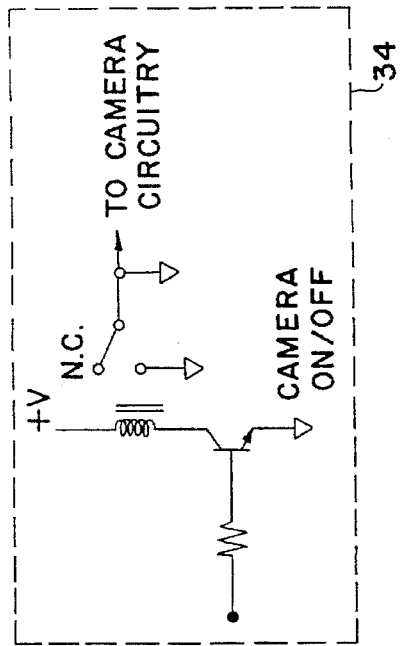
FIG. 10 is a schematic diagram of the camera switch circuitry.
Figure 9:
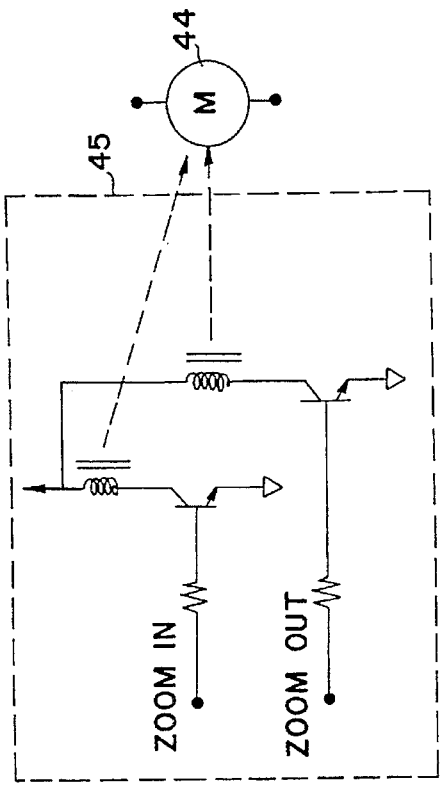
FIG. 9 is a schematic diagram of the Zoom motor circuitry of the base unit.
Figure 8:
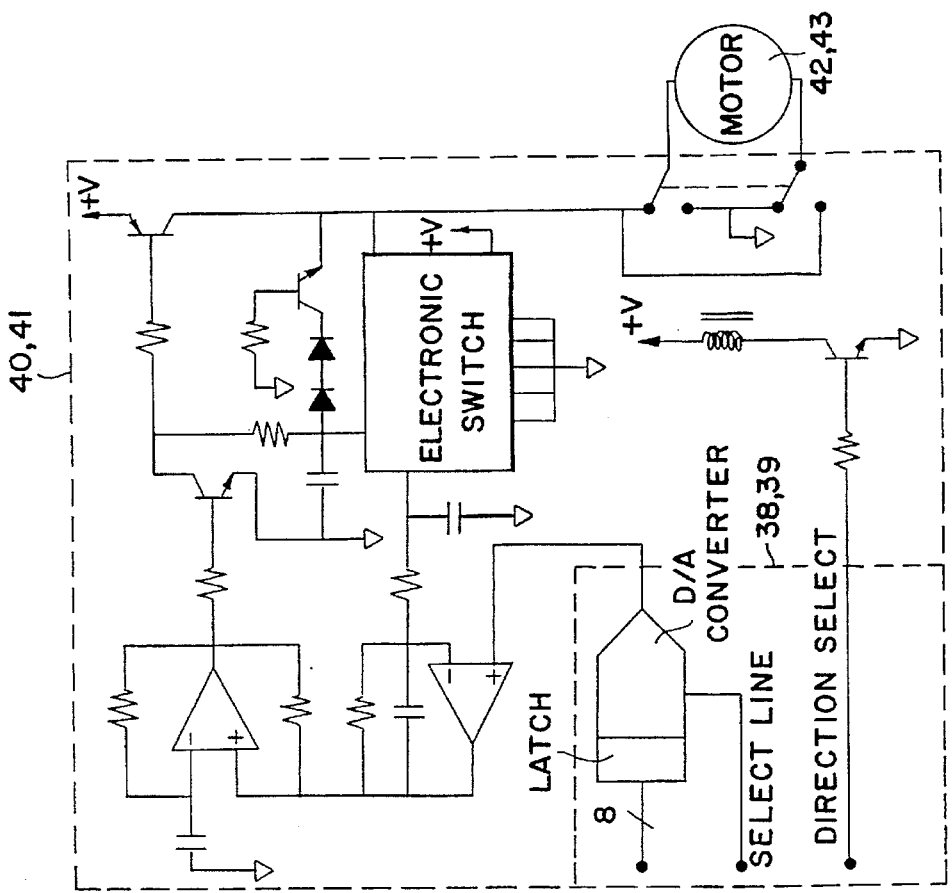
FIG. 8 is a schematic diagram of the PAN and TILT motor circuitry of the base unit.

Other outputs from controller 32 include the PAN and TILT motors 42 and 43 via respective controllers 40 and 41 (FIG. 8) and the ZOOM motor 44 with ZOOM IN and ZOOM OUT functions via "wide" and "tight" motor solenoids 45 (FIG. 9). FIG. 10 illustrates the switch control 34 for the camera 15.

Figure 6:
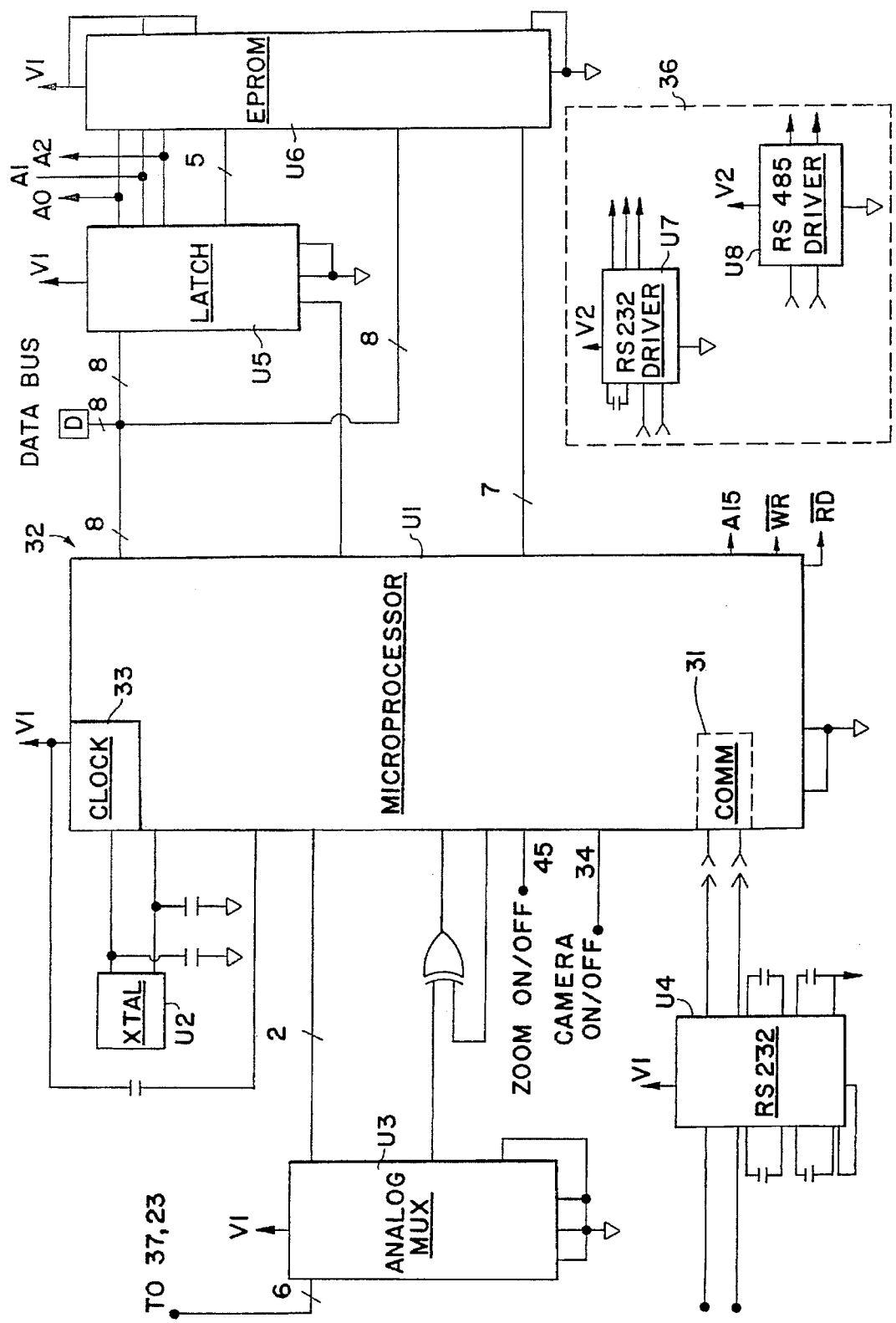
FIGS. 6–7 are schematic diagrams of the controller circuitry.
Figure 7:
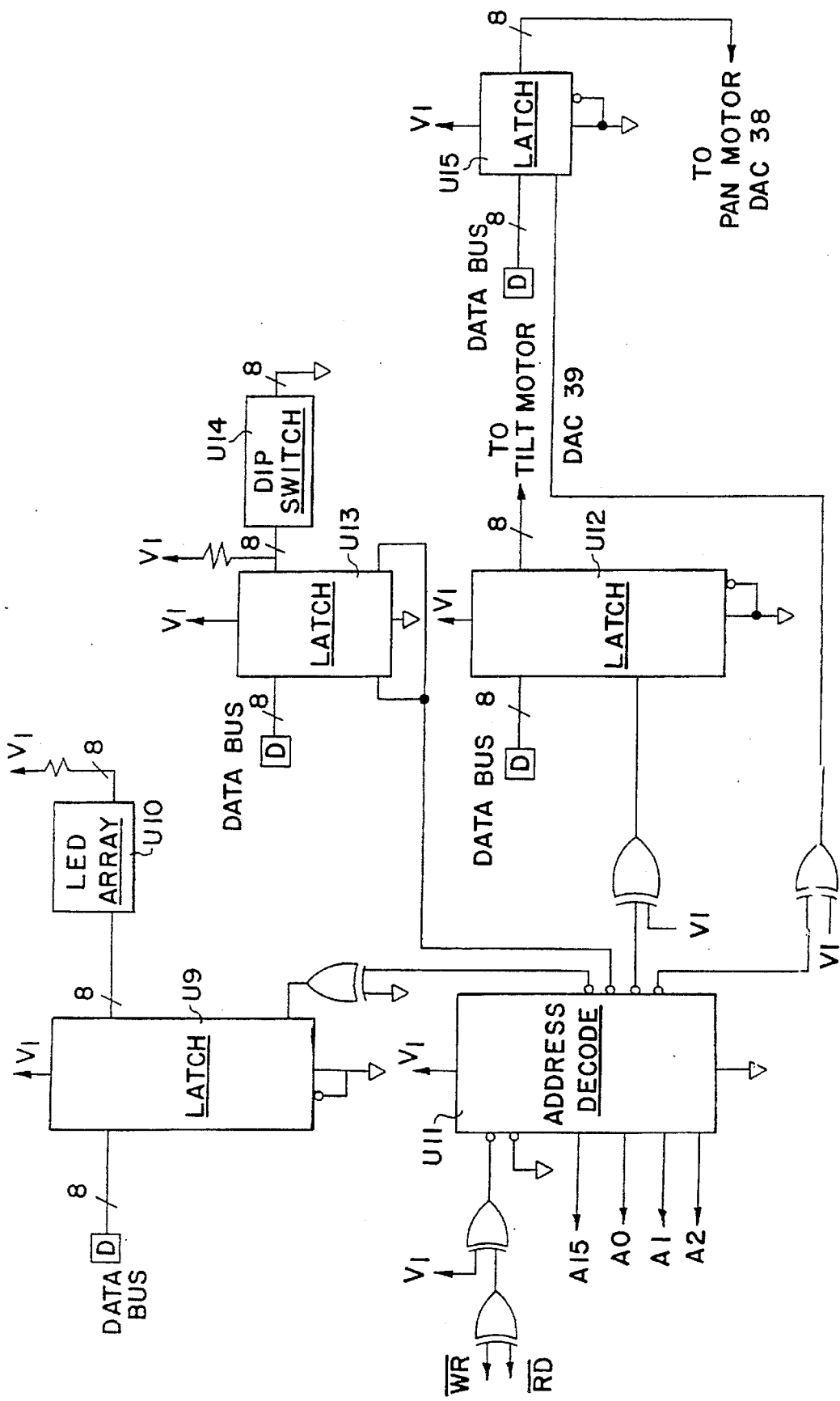

FIGS. 6–7 illustrate the circuitry of controller 32. Microprocessor U1 is an 8-bit device driven via crystal U2 and supplying clock circuitry 33 and internal timers. U3 is an analog multiplexer used to select IR diodes 17, 18, 19 and to input data from position indicator 37. COMM circuitry 31 supplies either U4, an RS-232 transceiver; or driver 36 containing U7, an RS-232 driver chip and U8, an RS-485 driver chip that can be used for a BUS 1 connection to computer C1 as shown in FIG. 2. U5 is an octal latch connecting to EPROM U6 in which the firmware programming for the system is placed. Point "D" indicates the microprocessor U1 DATA bus. The other connections to microprocessor U1 include an octal latch U9 which connects to LED array U10 having indicators for (1) PAN tracking/not tracking; (2) TILT tracking/not tracking; (3) camera ON/OFF; (4) FOLLOW/NOT FOLLOW; (5) ZOOM OUT ON/OFF; and (6) ZOOM IN ON/OFF. Dip switch U14 is connected to U13 and has switches for (1) camera ON time delay of 5 secs., 15 secs., 30 secs., or 60 secs. and OFF delay with the same values; and (2) tracking sensitivity of fast, medium fast, medium slow, or slow. Latches U12 and U15 connect to the motor DACs 38, 39 as indicated. ADDRESS DECODE chip U11 is the interface to U1. The operation of controller 32 is in accord with the programming of EPROM U6.

Figure 12:
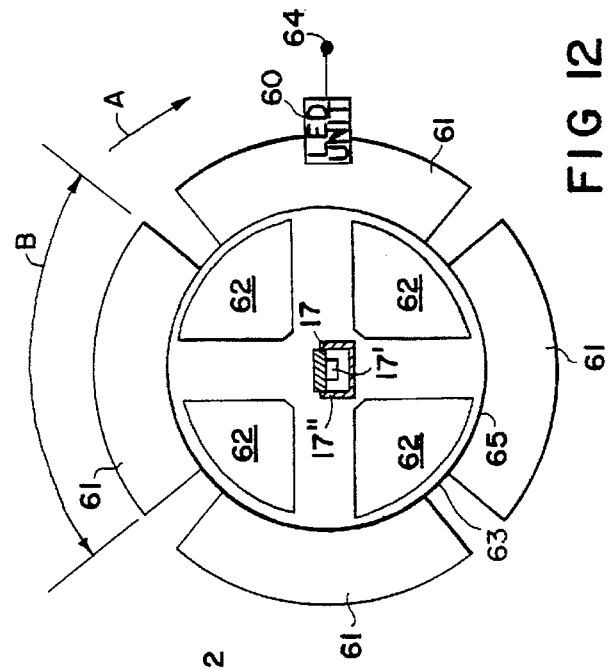
FIG. 12 is a top pictorial view of the infrared receiver assembly of the base unit.
Figure 11:
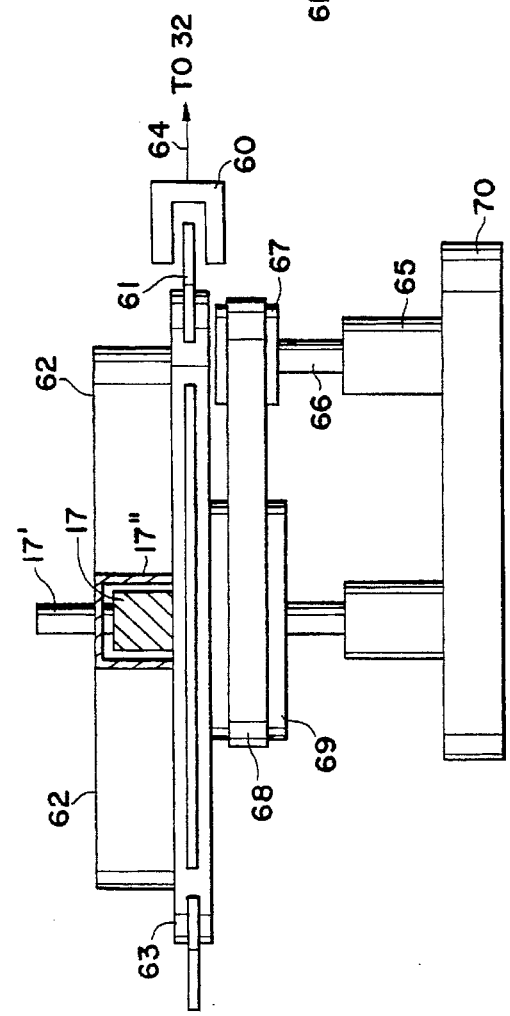
FIG. 11 is a simplified side view of the assembly of FIG. 4 with blinders removed to illustrate the relative positions of the components thereof.
Figure 13:
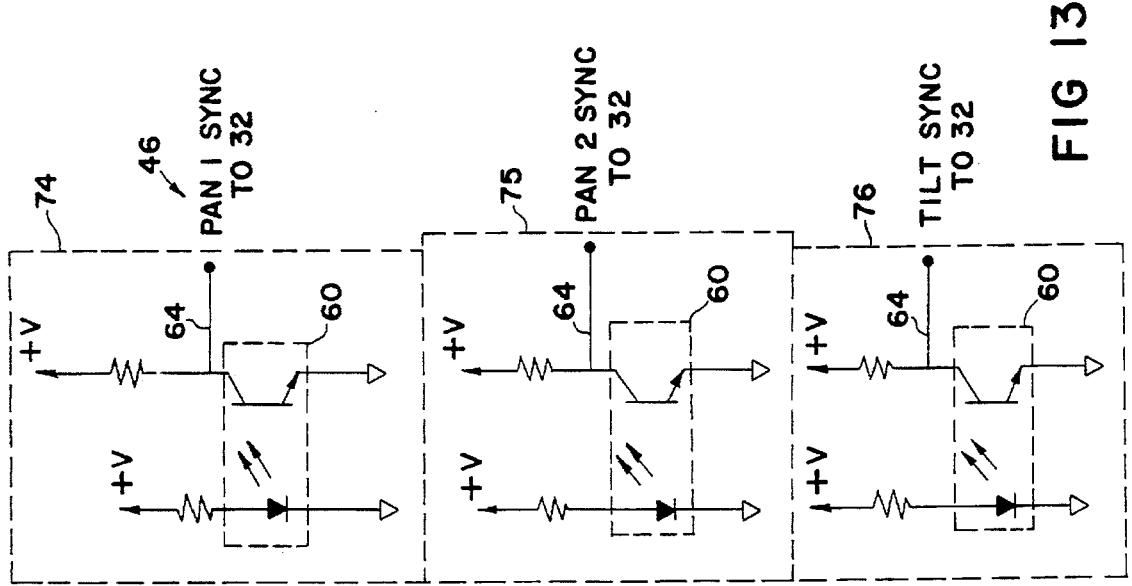
FIG. 13 is a schematic of the sensor circuitry of the position indication.

The position indication system 37 is illustrated in FIGS. 11 and 12. A conventional LED and receiver unit 60 is mounted to detect the position of TAB 61 and provides a "leading edge" signal and a "trailing edge" signal to controller 32. An internal timer in U1 will provide a time signal that measures the total scan time of a respective IR signal 13 as well as providing data indicating, in counts, precisely where the respective TAB 61 was during the point in a scan time interval when the base unit 11 detects the scanning signal 13 via peak detector 29. Accordingly, the position of a pair of blinders 62 and the corresponding signal 13 received through the view angle B with respect to any appropriate reference position angle is known with great precision at all times during each scan. The position sensors 74–76 are illustrated as for PAN 1, PAN 2, TILT (FIG. 13) respectively, and are conventional optical devices as understood in the art.

With respect now to FIG. 12, a top view of the PAN 1 receiver assembly is illustrated. A rotating disk 63 has a plurality of spaced pairs of blinders 62, which function to define a view angle B therebetween, mounted thereon. The spaces between the blinders 62, which function as signal blockers, is the viewing angle B of a particular IR receiver diode such as 17. Disk 63 and blinders 62 rotate in direction of arrow "A" while IR receiver 17 remains stationary. Diode 17 is mounted on post 17' and contained in a housing 17".

Position indication is accomplished by the use of tabs 61 mounted on the perimeter of disk 63 with position sensor 60 determining the beginning and end of a scan by detecting the leading and trailing edge of a tab 61 which is aligned across the view angle B defined by respective blinders 62. Position sensor 60 may be optical, magnetic, or mechanical in nature generally depending upon the desired rotational speed of disk 63. The sensor 60 provides an output on line 64 to the appropriate circuitry included in position indicator 37 (FIG. 2). Accordingly, the controller 32 will be provided data indicating the relative position of a pair of blinders 62 and thus the view angle B with respect to received "peak" IR signal 13. Disk 63 is rotated by any conventional means such as a motor 65 driving shaft 66 connected to pulley 67 which in turn connected to pulley 69 via belt 68. Pulley 69 is affixed to disk 63 as is well known in the art (FIG. 11). The entire assembly is mounted to plate 70 by any appropriate connections. IR receiver assemblies for PAN 2 and TILT are substantially identical in all respects to the PAN 1 assembly.

Figure 14:
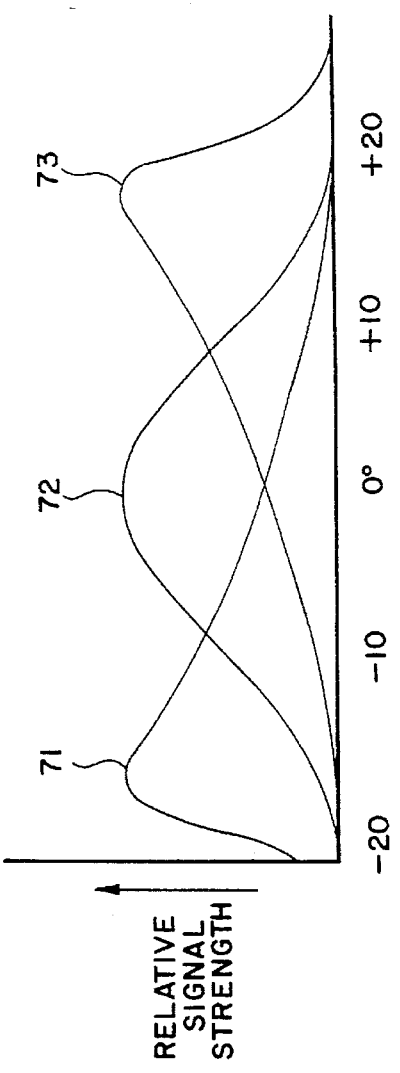
FIG. 14 is a diagram illustrating the scan angle of the infrared signal received by the assembly of FIGS. 4 and 5.
Figure 15:
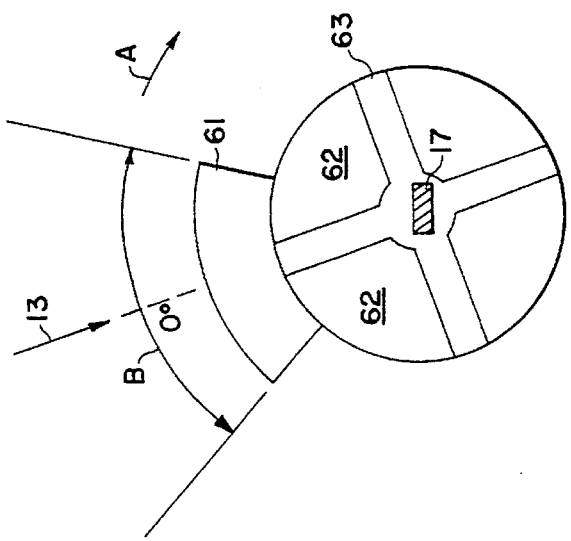
FIG. 15 is a simplified top view of the assembly of FIG. 12 illustrating the view angle for a received signal.

FIGS. 14–15 illustrates the scan of the IR receiver with IR signal 13 present. The blinders 62 allow the receiver to "scan" in the direction on arrow "A". The receiver in this arrangement scans a view angle B of approximately 70 degrees, or ±35 degrees from straight ahead orientation defined as 0 degrees reference plane. Because position indicator 60 provides data on the exact position of a given pair of blinder 62, the angle of the peak signal strength received from the 0 degree reference plane is always known. Accordingly, when the peak detector 29 (FIG. 2) alerts controller 32 the maximum signal strength has been reached, the effective angle between the transmitter 12 and the IR receiver assembly can readily be calculated by simple algorithms in U6 by controller 32. This effective angle represents an error signal defined as the angular difference between the remote unit 12 emitting IR signal 13 and the 0 degree plane. The controller 32 is programmed to supply control signals to the PAN and TILT motors 42, 43 respectively, in response to the respective developed error signals. For example, if the remote unit 12 is at an angle of approximately 15 degrees to the left of the 0 degree plane of the base unit 11, the signal peak detected by the IR receiver circuitry 16 will be understood by the base unit 11 as being signal peak 71 (FIG. 14). The same results are obtained for signal peaks 72 and 73. As understood in the art, the blinder spacing, the number of blinders, and the rotational speed of disk 63 can be selected to provide the appropriate signal strength, angular resolution, view angle, and range that are desired in a particular circumstance.

The use of PAN 1 and PAN 2 assemblies provides the controller 32 with data by which the range of the remote unit 12 from base unit 11 can be calculated by the usual trigonometric methods. This data can be used for control of ZOOM motor 44. The TILT IR assembly functions in substantially the same manner as each of the PAN 1 and PAN 2 assemblies.

Figure 16:
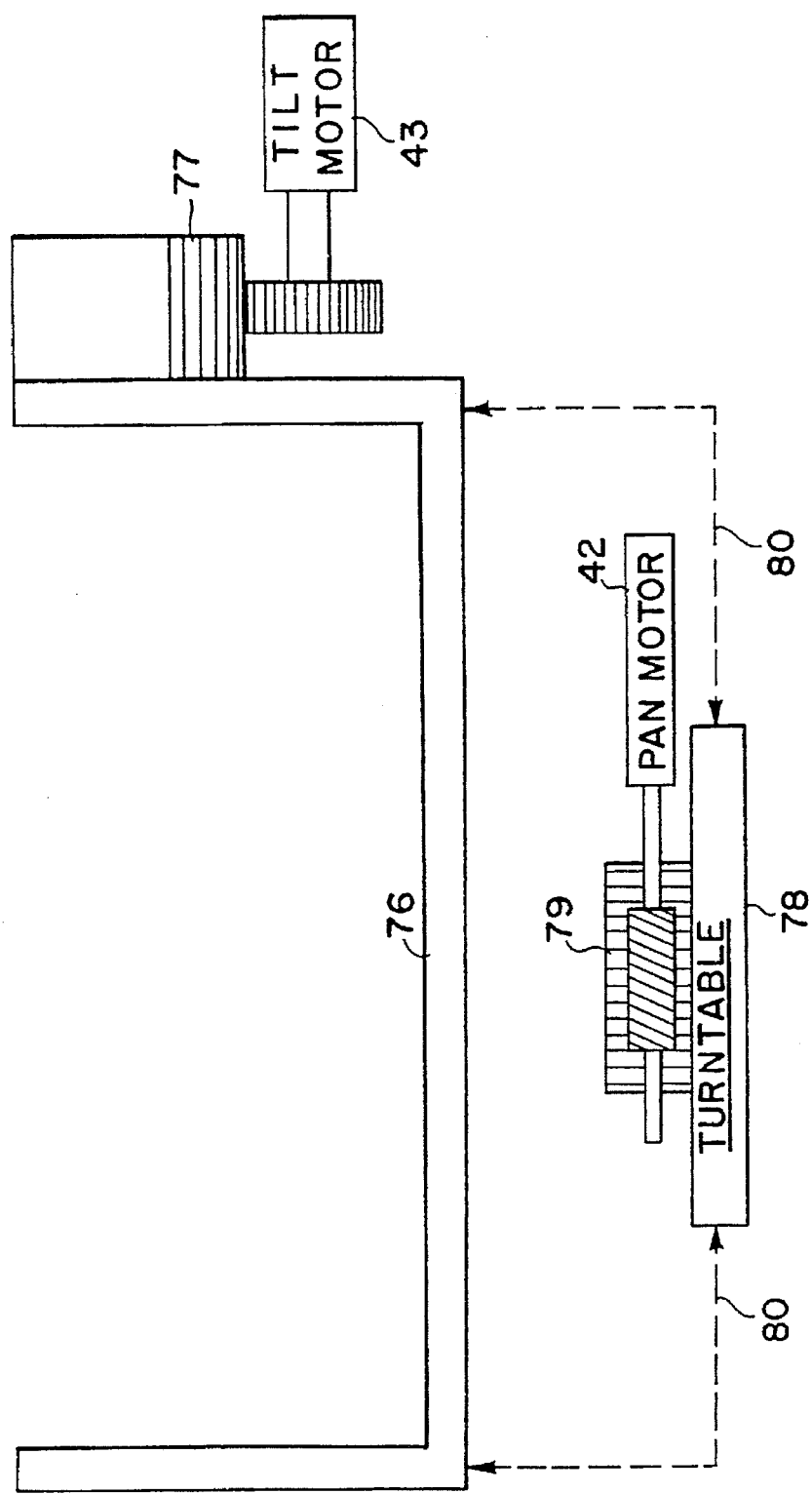
FIG. 16 is a pictorial diagram of the camera motion control apparatus.

The tracking system is designed principally for automatic tracking of remote unit 12 by base unit 11 via the PAN and TILT motors 42 and 43 as illustrated in FIG. 16. The camera 15 is mounted in elevation frame 76 which is tilted by gearing 77. 360 degree PAN movement via turntable 78 and gearing 79 connected to frame 76 by any appropriate means 80 completes the camera motion control by the base unit 11.

In the preferred embodiment of the present invention the remote transmitter consists of a group of four IR LEDs that are energized simultaneously as a single unit. This construction provides for an improved transmitted signal.

View angle B is defined physically in terms of the dimensions of the blinders 62. This provides a high level of directivity of reception which can be accomplished in other ways such as, for example, lenses for use with IR or UV or laser signals, or by way of a directional antenna with the use of RF signals. The objective in any event is the "scan" effect achieved by virtue of control of the direction of reception of a signal 13 by which the signal direction at which a predetermined level of signal strength can be received can be determined and used for tracking control.

Figure 17:
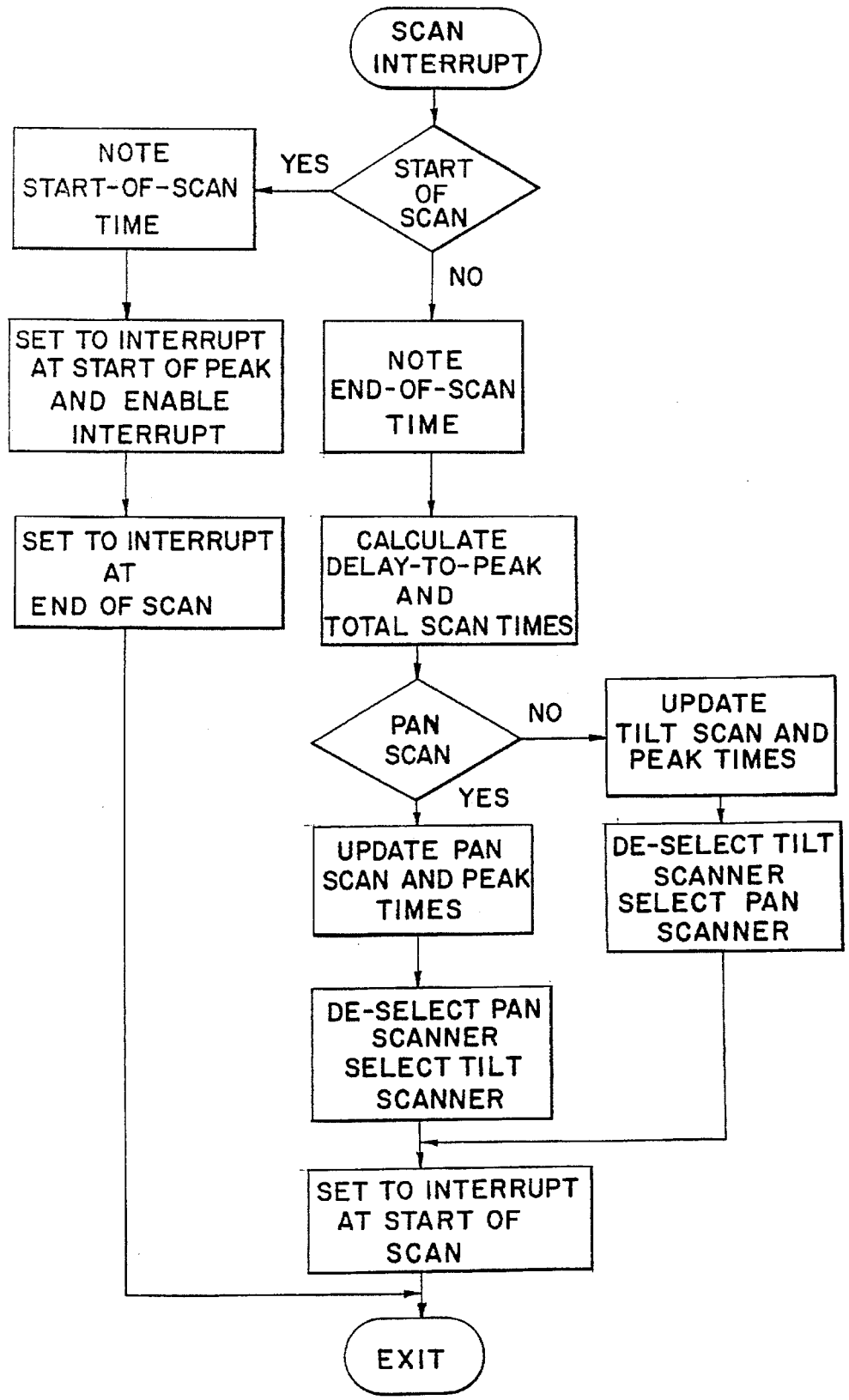
FIGS. 17–20 are flow charts illustrating some of the major functions of the tracking system of FIG. 1.

With respect now to FIGS. 17–20, a more detailed description can be given with regard to the controls of the microprocessor U1. In FIG. 17, it is shown that at START-OF-SCAN, as determined by the passage of a tab 61 under sensor 60 the time, as measured by counts of the internal clock 33 and associated timers, is placed in memory (U1 RAM). At the same time, the output of IR receiver 16 is tracking the magnitude of the input signal 13 at the selected IR diode 17–19. The peak detector and level translator 29, is designed so that a predetermined signal level is necessary to create a "peak" output signal. Preferably, the predetermined level of signal strength is, the maximum level received at the IR diodes 17–19. Microprocessor U1 will compute, via timer counts, the time it takes for tab 61 to travel from START-OF-SCAN to END-OF-SCAN (total scan) and the length of time from START-OF-SCAN to peak detection (Delay-To-Peak). Accordingly, the position of the tab 61 and view angle B is known with respect to the detection of the maximum received signal strength and the direction and the angular displacement of the view angle B from the reference angle can be calculated. The controller 32 will determine the exact "peak" alignment by noting the START-OF-PEAK and END-OF-PEAK times and then computing CENTER-OF-PEAK based upon when the received output signal increases above and decreases below the set values designed into peak detector 29.

Figure 20:
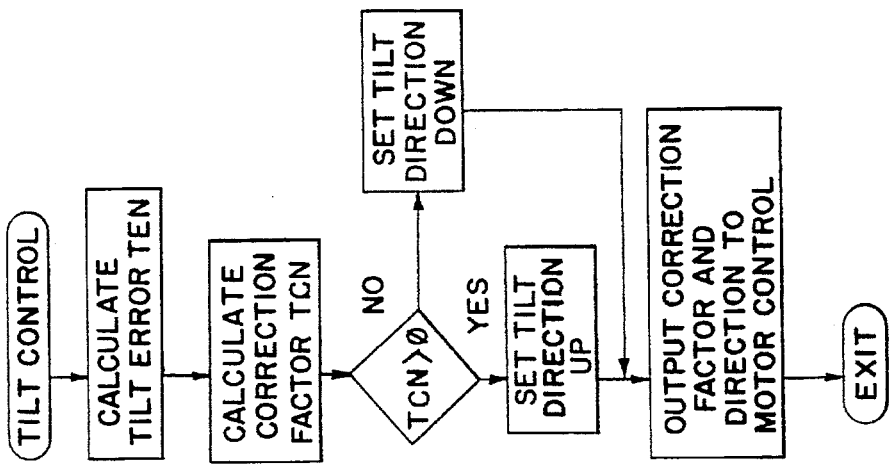
Figure 19:
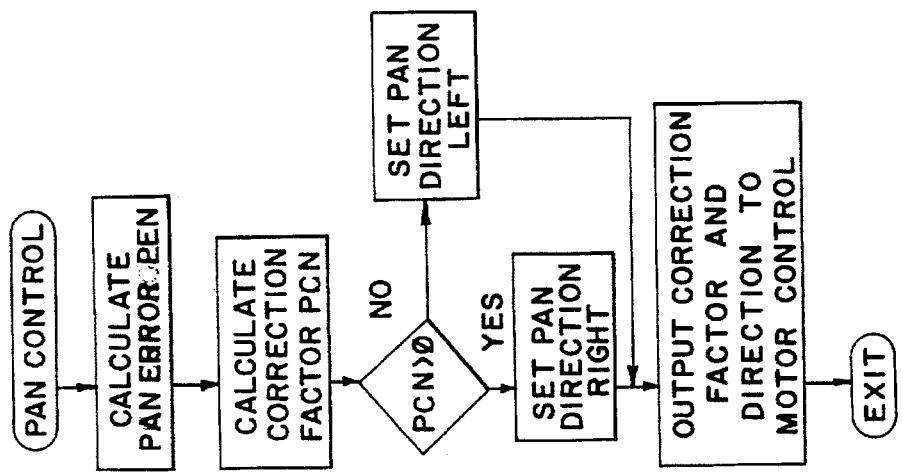
Figure 18:
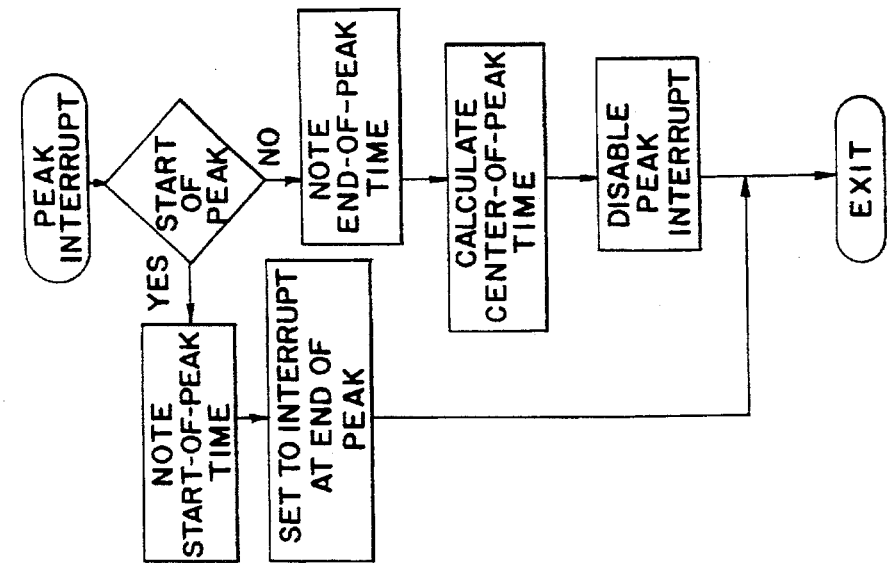

PAN and TILT control are based upon algorithms stored in EPROM U6 for the calculation of error signals based upon the angular displacement of the signal 13 from the reference angle defined as 0° (FIGS. 19, 20). These error signals are used to control the motion control assembly which is illustrated in FIG. 16. The base unit 11 will then be pointed at the signal 13 and remote unit 12 in response to the error signals developed by controller 32 and supplied to the motion control unit.

A computer C1 can communicate via BUS 1 to controller 32 and provide it with commands to FOLLOW/NOT FOLLOW which respectively enable and disable the automatic tracking features by controlling the error output signals generated by U1. C1 can be used to override any U1 command stored in EPROM U6 to manually control the base unit motion control and camera control systems.

The basic theory of the tracking system and method in accord with the present invention is the directivity of the reception of the transmitted signal from the remote unit. In the preferred embodiment of the system, an infrared signal 13 is transmitted by remote unit 12 and reception direction control is supplied via an infrared view angle control including rotating blinders 62. It is to be understood that the use of RF transmitted signal for signal 13 may be used with reception direction control being a directional antenna designed to detect the transmitted signal at a signal level established by the appropriate receiver circuitry for determining the direction of such transmitted signal.

In the preferred embodiment of the present invention, the remote unit 12 has a single transmitter of diode 50 (FIG. 3) to transmit into a given area. It is to be understood that a plurality of different transmitters could be used to provide adequate transmission of IR signal(s) 13 with any orientation of the remote unit 12. Thus, remote unit 12 could be built into a microphone or similar structure that can be handed from one person to another. Such a device may be more easily used if it were free to rotate without the loss of signal 13. This can be accomplished by multiple broadcast systems-using spaced transmitters 50 located around the neck or body of a microphone.

As understood in the art, infrared signals 13 may be replaced with other energy sources such as Ultraviolet Light (UV) circuitry if cost considerations allow and nothing adverse to the camera's picture taking quality occurs.

Variations of the specific circuitry employed in the tracking system 10 will depend oil the specific application. In particular, use of the tracking system 10 in a factory application for use with robots and machine vision technology may necessitate hardwired communications due to environmental interference. It may be desirable also to use other signals such as UV signals in the presence of other equipment utilizing IR signals that might interfere with system 10 operation.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A method of calculating the angular displacement of a moving object with respect to a reference angle and moving a movable means to automatically follow and track the moving object in response thereto comprising:

A. transmitting at the location of the moving object a signal from a radiant energy source into the area;
   B. scanning the area for the transmitted signal by varying the view angle through which the transmitted signal can be received during a time interval;
   C. receiving by a receiver the transmitted signal through the view angle;
   D. determining the point in the time interval at which each angular position of the view angle occurs during the time interval;
   E. automatically computing the angular displacement of the moving object with respect to the reference angle by comparing the point in the time interval at which the receiver received the transmitted signal with the angular position of the view angle through which the signal was received with respect to the same point in the time interval; and
   F. automatically moving the movable means in response to the results obtained in step E to follow and track the moving object.

2. A method of controlling the field of view of a camera operatively connected to a tracking unit that is movable by a controller to track by automatically positioning on a movable remote control unit and following same for taking pictures by the camera comprising the steps of:

A. moving a tracking unit in at least one plane by a controller;
   B. generating a signal of the electromagnetic spectrum by a remote unit;
   C. scanning an area for the transmitted signal and receiving same by the controller;
   D. establishing by the controller a reference position for the tracking unit;
   E. determining by the controller the error in alignment between the reference position and the remote unit; and
   F. controlling the field of view by the controller to reduce the alignment error to a predetermined amount as established by the controller to provide for the following of the movable remote control unit by the field of view of the camera.

3. The method of claim 2 wherein step A includes the step of:

G. moving by the controller the tracking unit in two planes.

4. The method of claim 2 wherein step B includes the step of:

G. generating an infrared signal.

5. The method of claim 2 wherein step B includes the step of:

G. generating a modulated signal.

6. A system for positioning and operating a camera that is movable to automatically follow and track a movable remote control unit for taking pictures by the camera comprising a movable tracking unit for mounting of a camera thereon, transmitter means at said remote control unit for transmitting a signal in the electromagnetic spectrum, scanning means including view angle control means for controlling the angular displacement with respect to a reference position at which said receiver means can receive said transmitted signal, and an automatic controller means for determining the displacement between the angle of reception of said transmitted signal and said reference position and for automatically controlling the movement of said tracking unit to track and follow a moving said control unit in response to the displacement so determined.

7. The system as defined in claim 6 wherein said transmitter means transmits an infrared signal.

8. The system as defined in claim 6 wherein said tracking unit is movable in two planes.

9. The system as defined in claim 6 wherein said transmitter means includes circuit means to modulate said transmitted signal.

* * * * *